United States Patent [19]

Aladiev et al.

[11] 4,274,019
[45] Jun. 16, 1981

[54] LIQUID-METAL MAGNETOHYDRODYNAMIC CONVERTER

[76] Inventors: Ivan T. Aladiev, ulitsa Marshala Birjuzova, 43, kv. 21, Moscow; Vazha A. Dzhamardzhashvili, ulitsa Guramishvili, 17, kv. 61; Manana A. Dikhashidze, ulitsa Bakhtrionskaya, 1 korpus, kv. 21, both of, Tbilisi; Sergei V. Teplov, Leninsky prospekt, 52, kv. 54, Moscow; David G. Tskhvirashvili, ulitsa Kipshidze, 6, kv. 14, Tbilisi, all of U.S.S.R.

[21] Appl. No.: 56,844

[22] Filed: Jul. 12, 1979

[30] Foreign Application Priority Data

Jul. 14, 1978 [SU] U.S.S.R. .................. 2645231

[51] Int. Cl.³ .................................. H02K 45/00
[52] U.S. Cl. .................................. 310/11
[58] Field of Search .................................. 310/11

[56] References Cited

U.S. PATENT DOCUMENTS

| | | | |
|---|---|---|---|
| 3,401,277 | 9/1968 | Larson | 310/11 |
| 3,414,744 | 12/1968 | Petrick | 310/11 |
| 3,443,129 | 5/1969 | Hammitt | 310/11 |
| 3,453,462 | 7/1969 | Hsu et al. | 310/11 |
| 3,468,180 | 9/1969 | Von Ohain et al. | 310/11 |
| 3,480,804 | 11/1969 | Tipton | 310/11 |
| 3,517,229 | 6/1970 | Bidard | 310/11 |
| 3,525,886 | 8/1970 | Radebold | 310/11 |
| 3,634,067 | 1/1972 | Klein | 310/11 X |
| 3,636,389 | 1/1972 | Petrick | 310/11 |
| 3,648,083 | 3/1972 | Low et al. | 310/11 |
| 3,878,410 | 4/1975 | Petrick et al. | 310/11 |
| 3,895,243 | 7/1975 | Amend et al. | 310/11 |

*Primary Examiner*—Donovan F. Duggan
*Attorney, Agent, or Firm*—Steinberg & Raskin

[57] ABSTRACT

A liquid-metal magnetohydrodynamic converter comprising such hydraulically interconnected components as a heat source a two-phase nozzle, a separator, a magnetohydrodynamic generator, a liquid diffuser, and a heat-regenerating means, said components being arranged successively so as to form a loop. The two-phase nozzle is provided with steam-bleeding units located in different sections over its length and having the outlets thereof coupled to steam inlets of the heat-regenerating means. A steam diffuser and a condenser are hydraulically interconnected and coupled to the separator and the steam inlet of the heat-regenerating means, respectively.

2 Claims, 3 Drawing Figures

LIQUID-METAL MAGNETOHYDRODYNAMIC CONVERTER

FIELD OF THE INVENTION

This invention relates to electric-power production through direct conversion of thermal energy into electric energy and in particular to liquid-metal magnetohydrodynamic converters.

It can be used to advantage as a power source on space vehicles, submarines and aircraft and also in electric-power production at steam electric stations and nuclear power stations.

PRIOR ART

With the advancement of space vehicles and fast-neutron reactor technology and in view of the need to increase the efficiency of steam electric stations and nuclear power stations, there arises a problem of providing a high-temperature energy converter using a liquid-metal working substance, one of the possible solutions to the problem being the provision of liquid-metal magnetohydrodynamic energy converters whose advantages over energy converters of other types include a high specific power, improved static parameters and in effect high reliability at high temperatures. However, a problem encountered in the development of a liquid-metal magnetohydrodynamic converter having an acceptable efficiency consists in ensuring highly effective conversion of thermal and potential energy of a two-phase liquid-metal working substance into mechanical energy of liquid and subsequent conversion of this energy into electric energy by the use of a magnetohydrodynamic generator.

Known in the art is a liquid-metal magnetohydrodynamic converter (cf. USSR Inventor's Certificate No. 196, 197, Cl. 21 g 35, 1965) comprising such hydraulically interconnected and successively arranged components as a heat source, a two-phase nozzle, a separator, a magnetohydrodynamic generator and a liquid diffuser as well as a steam diffuser and a condenser which are hydraulically interconnected and coupled to the separator and the heat source.

The arrangement of the aforesaid converter does not, however, permit the accomplishment of a thermodynamic cycle involving heat regeneration, a limitation resulting in low cyclic thermal efficiency within the entire region of initial cyclic steam content values and in effect substantially reducing the efficiency of the whole converter.

Another disadvantage of the known converter is that a two-phase liquid metal flow has relatively high speeds, which may cause intensive erosion of the walls of the nozzle, separator and other components of the converter of high temperatures.

Furthermore, due to relatively high speeds and a high steam content of the two-phase flow at the nozzle outlet, the separator employed in the known converter is characterized by low efficiency at preset initial cyclic parameters, which in its turn substantially reduces the efficiency of the converter.

BRIEF DESCRIPTION OF THE INVENTION

It is an object of the present invention to provide a liquid-metal magnetohydrodynamic converter having an enhanced efficiency.

Another object of the invention is to provide a converter having a higher operational reliability.

The above objects are accomplished by that a liquid-metal magnetohydrodynamic converter comprising such hydraulically interconnected and successively arranged components as a heat source, a two-phase nozzle, a separator, a magnetohydrodynamic generator and a liquid diffuser as well as a steam diffuser and a condenser which are hydraulically interconnected and coupled to the separator and the heat source, according to the invention, additionally includes a heat-regenerating means having its inlet coupled to the outlet of the liquid diffuser and the outlet thereof to the inlet of the heat source, whereas the nozzle is provided with steam-bleeding units arranged in different sections of the nozzle over its length and having the outlets thereof coupled to steam inlets of the heat-regenerating means whose other steam inlet is connected to the condenser.

It is of advantage that the heat-regenerating means should comprise miscible regenerators successively interconnected in the direction of liquid metal flow and provided with pumps, one steam inlet of the first regenerator being connected to the condenser outlet and the other inlet thereof to the outlet of the liquid diffuser, while the outlet of the pump of the last regenerator is connected to the inlet of the heat source and the steam inlets of the other regenerators are connected to the outlets of the steam-bleeding units.

The present invention makes it possible to substantially increase thermal cyclic efficiency, i.e., efficiency of the entire converter at all possible values of the initial cyclic steam content.

This invention also allows decreasing a steam content and a mixture speed at the outlet of the two-phase nozzle with increased cyclic thermal efficiency, which in its turn substantially enhances the separator efficiency and in effect the efficiency of the entire converter.

Another advantage of the converter forming the subject of the present invention is that a lower steam content at the nozzle outlet makes it possible to decrease the load acting on the condenser whereby its dimensions will be appreciably reduced.

Furthermore, the hereinproposed converter permits operation of the heat source at smaller temperature drops, which is particularly advantageous when a nuclear reactor is utilized as the heat source.

BRIEF DESCRIPTION OF DRAWINGS

The other objects and advantages of the present invention will become apparent from the discussion of a specific embodiment thereof, taken in conjunction with the accompanying drawings, wherein.

DETAILED DESCRIPTION OF THE INVENTION

Figure 1:
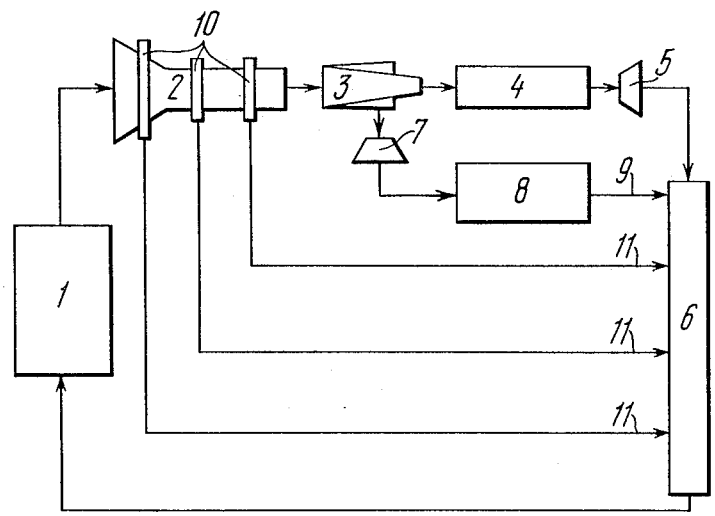
FIG. 1 is a block diagram of a liquid-metal magnetohydrodynamic converter according to the invention.

The liquid-metal magnetohydrodynamic converter forming the subject of the present invention comprises such hydraulically interconnected components as a heat source 1 (FIG. 1), a two-phase nozzle 2, a separator 3, a magnetohydrodynamic generator 4, a liquid diffuser 5, and a heat-regenerating means 6, all of said components being arranged successively so as to form a loop. The converter also includes such hydraulically interconnected components as a steam diffuser 7 coupled to the separator 3 and a condenser 8 coupled to a steam inlet 9 of the heat-regenerating means 6. The nozzle 2 is provided with steam-bleeding units 10 arranged in different sections of the nozzle 2 over its length and having the outlets thereof connected to steam inlets 11 of the heat-regenerating means 6.

Figure 2:
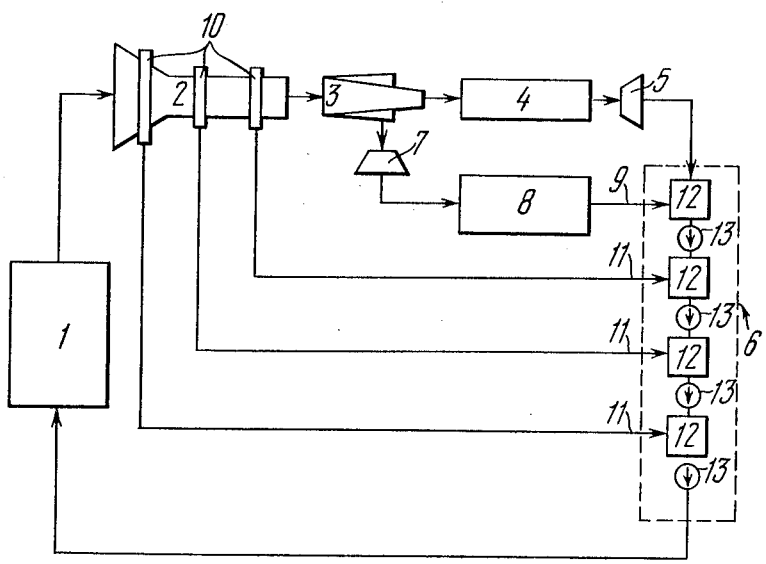
FIG. 2 is a block diagram of a liquid-metal magnetohydrodynamic converter comprising miscible regenerators according to the invention.

The cyclic heat-regenerating means 6 (FIG. 2) incorporates four miscible regenerators 12 successively interconnected in the direction of liquid metal flow and provided with pumps 13. The steam inlet of the first regenerator 12 serves as the steam inlet 9 of the heat-regenerating means 6, while the steam inlets of the other regenerators 12 act as the steam inlets 11 of the heat-regenerating means 6.

The liquid-metal magnetohydrodynamic converter forming the subject of the present invention operates in the following manner.

Figure 3:
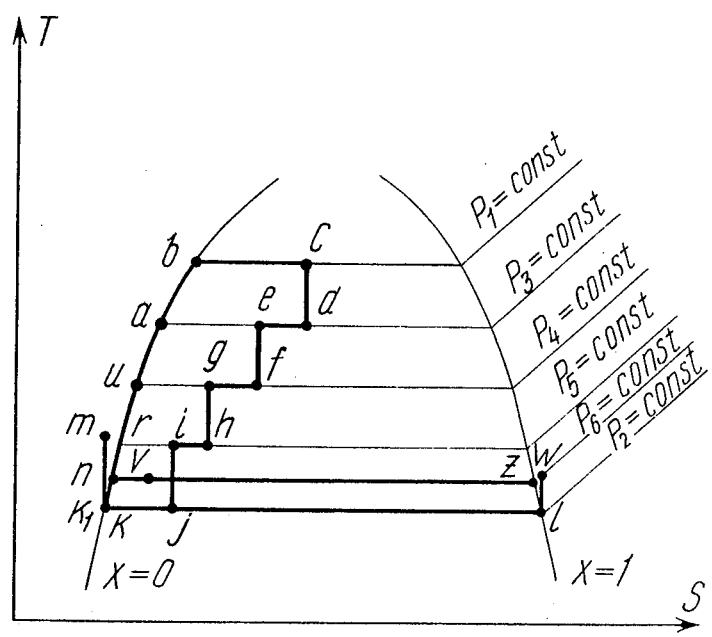
FIG. 3 is a graph illustrating a reversible thermodynamic cycle of the converter, wherein the absissa is entropy S and the ordinate is temperature T.

At constant pressure $P_1$ (FIG. 3) in the heat source 1 (FIG. 1) a heat flow $Q_1$ is supplied to liquid metal (process a-b-c of FIG. 3). The resultant steam-liquid mixture having a temperature $T_1$ and a flow rate G is delivered to the nozzle 2 (FIG. 1) wherein it is expanded to constant pressure $P_2$ (process c-a-e-f-g-h-i-j of FIG. 3). During the expansion process c-d-e-f-g-n-i-j occurring at steam-bleeding sections by the use of the steam-bleeding units 10 (FIG. 1) at constant pressures $P_3$, $P_4$, $P_5$ (FIG. 3), the amounts of bled steam are $G_1$ (process d-e), $G_2$ (process f-g), and $G_3$ (process h-i) with $P_1 > P_3 > P_4 > P_5 > P_2$. The two-phase flow is primarily expanded in the nozzle 2 (FIG. 1) ahead of and after the sections of the steam-bleeding units 10 (processes c-d, e-f, g-h, i-j of FIG. 3).

From the nozzle 2 (FIG. 1) the two-phase mixture flow having a flow rate of $G_4 = G - (G_1 + G_2 + G_3)$ is delivered to the separator 3 wherein the phases are separated (processes j-k and j-l of FIG. 3). From the separator 3 (FIG. 1) the liquid metal hereinafter referred to as liquid) having a flow rate of $G_5 = G_4 - G_6$ (where $G_6$ is the amount of steam separated in the separator 3) is supplied to the magnetohydrodynamic generator 4, wherein kinetic energy of the liquid is converted into electric energy (static parameters of the liquid at the inlet of the generator 4 are characterized by a point k of FIG. 3, whereas its dynamic parameters are characterized by a point m shown in the same drawing). The cyclic energy conversion process is characterized by a length $m-k_1$ of FIG. 3, wherein $k_1$ characterizes the dynamic parameters of the liquid at the outlet of the generator 4 (FIG. 1). On completion of energy conversion, the liquid is supplied from the generator 4 to the diffuser 5 in which the static pressure of the liquid increases due to residual pressure. Thereafter the liquid is delivered to the heat-regenerating means 6 wherein it is heated from the lower cyclic temperature to the temperature of steam bled from the unit 10 nearest to the inlet of the nozzle 2. The liquid is heated in the heat-regenerating means 6 (processes k-n, n-r, r-u, u-a of FIG. 3) due to (a) condensation heat of a moist steam flow (process v-n of FIG. 3) delivered from the condenser 8 (FIG. 1) to the inlet 9 of the heat-regenerating means 6 and (b) condensation heat of extracted steam flows (processes h-i, f-g, d-e, of FIG. 3) delivered from the units 10 (FIG. 1) to the inlets 11 of the heat-generating means 6. From the heat-regenerating means 6 the liquid is returned to the source 1, thereby completing the cycle.

When this is done, the steam is supplied from the separator 3 through the diffuser 7 wherein its static pressure increases from $P_2$ (FIG. 3) to $P_6$ (process l-w of FIG. 3) to the condenser 8 (FIG. 1) in which the heat $Q_2$ is rejected. The steam is thus condensed in the condenser 8 (process w-z-v of FIG. 3).

In one of the preferred embodiments of the invention the heat-regenerating means 6 (FIG. 2) operates as follows.

In the first miscible regenerator 12 in the direction of liquid flow there occurs the mixing of liquid having the flow rate $G_5$ with a moist steam flow having the flow rate $G_6$ and delivered to the inlet 9 of the regenerator 12 from the condenser 8. The mixing results in the occurrence of process k-n (FIG. 3) during which the liquid is heated from temperature $T_2$ to the temperature of moist steam and of the moist steam condensation process at a pressure of $P_6$. The mixing completed, the liquid having a flow rate of $(G_5 + G_6)$ is pumped by the pump 13 (FIG. 2) of said regenerator 12 to the next regenerator 12 wherein the liquid is mixed with the bled steam delivered to the inlet 11 thereof from the unit 10 at a pressure of $P_5$ ($P_5 > P_6 > P_2$). The mixing results in the occurrence of liquid heating (process n-r of FIG. 3) and bled steam condensation process at the pressure of $P_5$. Thereafter the pump 13 (FIG. 2) of said regenerator 12 pumps the liquid having a flow rate of $(G_5 + G_6 + G_3)$ to the subsequent regenerator 12 wherein the occurring process is similar to that of the preceding regenerator 12. The pump 13 of the last regenerator 12 in the direction of liquid flow pumps the liquid having a flow rate of $G = G_5 + G_6 + G_3 + G_2 + G_1$ to the source 1 at the pressure of $P_1$.

In compliance with the invention, the number of the regenerators 12 is chosen to suit a specific installation.

The present invention opens up a wider field of applications for liquid-metal magnetohydrodynamic converters.

What is claimed is:

1. A liquid-metal magnetohydrodynamic converter comprising:

a heat source having an inlet and an outlet;

a two-phase nozzle having an inlet and an outlet and hydraulically connected via said inlet thereof to said outlet of said heat source;

steam-bleeding units of said two-phase nozzle located in different sections of said two-phase nozzle over its length, each having individual outlets;

a separator having an inlet, a first outlet and a second outlet and hydraulically connected via said inlet thereof to said outlet of said two-phase nozzle;

a magnetohydrodynamic generator having an inlet and an outlet and hydraulically connected via said inlet thereof to said first outlet of said separator;

a liquid diffuser having an inlet and an outlet and hydraulically connected via said inlet thereof to said outlet of said magnetohydrodynamic generator;

a cyclic heat-regenerating means having an inlet, a group of steam inlets to suit the number of said steam-bleeding units and an outlet and hydraulically connected via said inlet thereof to said outlet of said liquid diffuser, via said steam inlets to said outlets of said steam-bleeding units and via said outlet to said inlet of said heat source;

a steam diffuser having an inlet and an outlet and hydraulically connected via said inlet thereof to said second outlet of said separator;

a condenser having an inlet and an outlet and hydraulically connected via said inlet thereof to said outlet of said steam diffuser and via said outlet to said inlet of said heat-regenerating means.

2. A converter as claimed in claim 1, wherein said heat-regenerating means includes:

miscible regenerators, each regenerator having an inlet, a steam inlet, and an outlet; said inlet of said first miscible regenerator in the direction of liquid metal flow serving as said inlet of said heat-regenerating means; said steam inlet of said first miscible regenerator in the direction of liquid metal flow being hydraulically connected to said outlet of said condenser;

pumps to suit the number of said miscible regenerators, each pump having an inlet and an outlet and hydraulically connected via said inlet thereof to said outlet of the preceding miscible regenerator and via said outlet to said inlet of the subsequent miscible regenerator; said outlet of the last pump in the direction of liquid metal flow serving as said outlet of said heat-regenerating means.

* * * * *